(12) United States Patent
Mueller et al.

(10) Patent No.: US 6,447,860 B1
(45) Date of Patent: Sep. 10, 2002

(54) SQUEEZABLE CONTAINERS FOR FLOWABLE PRODUCTS HAVING IMPROVED BARRIER AND MECHANICAL PROPERTIES

(75) Inventors: Chad Mueller; Thomas Lee, both of Appleton, WI (US); Alain Jupin, Sainte Menhould (FR)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 09/570,086

(22) Filed: May 12, 2000

(51) Int. Cl.⁷ .................. B29D 23/20; B32B 1/08; C08J 3/20
(52) U.S. Cl. .............. 428/36.6; 428/36.7; 428/36.91; 428/515; 428/516; 428/520; 524/445
(58) Field of Search .................. 524/445; 428/36.6, 428/36.7, 36.91, 515, 516, 520

(56) References Cited

U.S. PATENT DOCUMENTS

| | | | |
|---|---|---|---|
| 5,328,975 A | 7/1994 | Hanson et al. ............. 528/29 |
| 5,352,493 A | 10/1994 | Dorfman et al. .......... 427/530 |
| 5,385,776 A | 1/1995 | Maxfield et al. .......... 428/297 |
| 5,401,587 A | 3/1995 | Motohiro et al. .......... 428/688 |
| 5,514,734 A | 5/1996 | Maxfield et al. .......... 523/204 |
| 5,552,469 A | 9/1996 | Beall et al. .............. 524/445 |
| 5,554,670 A | 9/1996 | Giannelis et al. ......... 523/209 |
| 5,556,678 A | * 9/1996 | Jupin et al. .............. 428/36.6 |
| 5,573,783 A | 11/1996 | Desieno et al. ........... 424/490 |
| 5,578,672 A | 11/1996 | Beall et al. .............. 524/446 |
| 5,604,038 A | 2/1997 | Denes et al. .............. 428/429 |
| 5,705,222 A | 1/1998 | Somasundaran et al. .... 427/320 |
| 5,716,709 A | 2/1998 | Ferguson et al. .......... 428/420 |
| 5,733,644 A | 3/1998 | Tanaka et al. ............. 428/215 |
| 5,747,560 A | 5/1998 | Christiani et al. ......... 523/209 |
| 5,760,106 A | 6/1998 | Pinnavaia et al. .......... 523/209 |
| 5,763,101 A | 6/1998 | Yoshimi et al. ............ 428/524 |
| 5,795,648 A | 8/1998 | Goel et al. ............... 428/336 |
| 5,801,216 A | 9/1998 | Pinnavaia et al. .......... 523/209 |
| 5,807,629 A | 9/1998 | Elspass et al. ............ 428/323 |
| 5,837,763 A | 11/1998 | Ferraro et al. ............ 524/449 |
| 5,844,032 A | 12/1998 | Serrano et al. ............ 524/445 |
| 5,858,457 A | 1/1999 | Brinker et al. ............ 427/162 |
| 5,866,645 A | 2/1999 | Pinnavaia et al. .......... 524/443 |
| 5,876,812 A | 3/1999 | Frisk et al. .............. 428/35.7 |
| 5,877,248 A | 3/1999 | Beall et al. .............. 524/450 |
| 5,880,197 A | 3/1999 | Beall et al. .............. 524/445 |
| 5,883,173 A | 3/1999 | Elspass et al. ............ 524/446 |
| 5,910,523 A | 6/1999 | Hudson ................... 523/213 |
| 5,916,685 A | 6/1999 | Frisk .................... 428/446 |
| 5,952,095 A | 9/1999 | Beall et al. .............. 428/332 |
| 5,958,514 A | 9/1999 | Havey et al. ............. 427/386 |
| 5,962,553 A | 10/1999 | Ellsworth ................ 523/216 |
| 5,972,448 A | 10/1999 | Frisk et al. .............. 428/35.7 |
| 6,117,541 A | 9/2000 | Frisk .................... 428/327 |
| 6,203,923 B1 | 3/2001 | Bansleben et al. ......... 428/500 |
| 6,217,962 B1 | 4/2001 | Werth ................... 428/36.9 |

FOREIGN PATENT DOCUMENTS

| | | | |
|---|---|---|---|
| EP | 0639145 B1 | * | 9/1997 |
| JP | 01139347 A | * | 5/1989 |
| WO | WO 98/01346 | | 1/1998 |
| WO | WO 98/10012 | | 3/1998 |
| WO | WO 98/29491 | | 7/1998 |
| WO | WO 98/29499 | | 7/1998 |
| WO | WO 98/53000 | * | 11/1998 |
| WO | WO 99/02593 | | 1/1999 |
| WO | WO 99/07790 | * | 2/1999 |
| WO | WO 99/32403 | | 7/1999 |
| WO | WO 99/35185 | | 7/1999 |
| WO | WO 99/35186 | | 7/1999 |
| WO | WO 99/47598 | | 9/1999 |
| WO | WO 99/49991 | | 10/1999 |

* cited by examiner

*Primary Examiner*—Sandra M. Nolan
(74) *Attorney, Agent, or Firm*—McDermott, Will & Emery

(57) ABSTRACT

The present invention relates to squeezable containers for flowable products having improved barrier and/or mechanical properties and methods for making said sqeezable containers. These improvements are achieved by incorporating into the squeezable container a polymeric nanocomposite comprising a polymer and nanosize particles of a modified clay.

2 Claims, No Drawings

SQUEEZABLE CONTAINERS FOR FLOWABLE PRODUCTS HAVING IMPROVED BARRIER AND MECHANICAL PROPERTIES

The present invention relates to squeezable containers for flowable products having improved barrier and/or mechanical properties and methods for making said sqeezable containers. These improvements are achieved by incorporating into the squeezable container a polymeric nanocomposite comprising a polymer and nanosize particles of a modified clay.

It has been known to manufacture compositions which comprise treated clays in a polymeric base. These compositions are known as nanocomposites.

Carter, et al., U.S. Pat. No. 2,531,396 discloses a reinforced elastomer and a process for producing said elastomer which contains a modified clay. The clay of the invention includes montmorillonite, viz, sodium, potassium, lithium and other bentonites. The clay is characterized by an unbalanced crystal lattice which are believed to have negative charges neutralized by inorganic cations.

Frisk, U.S. Pat. No. 5,916,685 discloses a transparent multilayer laminate containing nanoparticulates having superior barrier properties to oxygen, water vapor and aromatic gases.

Frisk, et al., U.S. Pat. No. 5,876,812 disclose a container made of polymeric material which contain nanoparticulates to increase barrier properties.

Frisk, et al., U.S. Pat. No. 5,972,448 disclose a container made from a polymer material which has been integrated with a plurality of nanosize particles.

Serrano, et. al., U.S. Pat. No. 5,844,032 discloses the manufacturing of nanocomposites which are intercalated and combined with an EVOH matrix polymer.

Beall, et al., U.S. Pat. No. 5,952,095 disclose how to make specific intercalated nanoparticulates. The disclosure teaches nanoparticulates themselves, as well as methods of making them in addition to organic liquid compositions containing nanoparticulates.

Beall, et al., U.S. Pat. No. 5,880,197 disclose clays treated with organic molecules which when so treated intercalate the clay particles to create a matrix-like structure.

Beall, et al., U.S. Pat. No. 5,877,248 disclose a method of increasing the viscosity of an organic liquid by combining it with nanocomposite materials having specific characteristics/limitations.

Beall, et al., U.S. Pat. No. 5,578,672 disclose intercalates formed by mixing a phyllosilicate with a polymer and a liquid carrier, and extruding the mixture through a die-opening to absorb or intercalate the polymer between adjacent phyllosilicate platelets.

Christiani, et al., U.S. Pat. No. 5,747,560 disclose a process for making polymeric nanocomposite materials wherein the platelet particles have an average thickness equal to or less than about 50 Å and a maximum thickness of about 100 Å.

Maxfield, et al., U.S. Pat. No. 5,514,734 disclose a process of forming nanocomposite material comprising a polymer matrix comprising a polymeric material and dispersed particles selected from the group consisting of platelet or fibrillar particles having specific characteristics.

Maxfield, et al., U.S. Pat. No. 5,385,776 disclose a composite formed from a gamma phase polyamide having dispersed therein a particulate material such as a phyllosilicate.

Alexandre, et. al., WO 99/47598, disclose a nanocomposite which is a dispersion of nanofiller particles derived from layered metal oxides or metal oxide salts. The nanocomposite is advantageously prepared by first swelling an untreated clay in water, then removing the water to form an organophilic clay that is dispersible in non-polar organic solvents. The organophilic clay can then be treated with an alkyl aluminoxane and subsequently a catalyst to form a complex that promotes olefin or styrenic polymerization and platelet dispersion. The nanocomposite can be prepared directly by in situ polymerization of the olefin or the styrene at the nanofiller particles without shear, without an ion exchange step, and without the need to incorporate polar substituents into the polyolefin or polystyrene.

Fischer, et al., WO 99/35185 disclose a method for preparing a nanocomposite material based on a polymeric matrix and a layered double hydroxide. The disclosure further relates to a nanocomposite material obtainable by such method and to a shaped article manufactured from such nanocomposite material Barbee, et al., WO 99/32403 disclose a composition comprising a polymer having dispersed therein at least one layered clay material which has been cation exchanged with organic cation salts; and at least one expanding agent which is compatible with said polymer. Preferred polymers include polyesters. The compositions of the disclosure show vastly improved platelet separation as evidenced by higher than previously reported basal spacing. The disclosure further relates to polyester composite materials having improved barrier useful for forming packages that have improved gas barrier properties.

Fischer, WO 99/07790 discloses a nanocomposite material on the basis of a clay having a layered structure and a cation exchange capacity of from 30 to 250 milliequivalents per 100 grams, a polymeric matrix and a block copolymer or a graft copolymer, which block copolymer or graft copolymer comprises one or more first structural units, which are compatible with the clay, and one or more second structural units, which are compatible with the polymeric matrix. Fischer further discloses a nanocomposite material wherein the clay has a cation exchange capacity of from 50 to 200 milliequivalents per 100 gram. In addition, Fischer discloses a nanocomposite material wherein the polymeric matrix is selected from the group consisting of polyolefins, vinyl polymers, polyesters, polyethers, polysiloxanes and acrylic polymers.

Li, et al., WO 98/53000 disclose toughened nanocomposite materials which are prepared based on a blend of one or more thermoplastic engineering resins, e.g., nylon, a functionalized, e.g., brominated, copolymer of a $C_4$–$C_7$ isomonoolefin, e.g., isobutylene, and a para-alkylstyrene, e.g., para-methylstyrene, and further contain a uniformly dispersed exfoliated phyllosilicate layered clay, e.g., montmorillonite. The nanocomposite materials exhibit superior mechanical properties, including enhanced impact strength. The composition of this disclosure may be extruded, compression molded, blow molded or injection molded into various shaped articles including fibers, films, industrial parts such as automotive parts, appliance housings, consumer products, packaging and the like. The resulting articles exhibit both high impact strength and low vapor permeability.

Matayabas, et al., WO 98/29499 disclose polyester-platelet particle composite compositions comprising about 0.01 to about 25 weight percent platelet particles dispersed in at least one polyester wherein said composition has an intrinsic viscosity of greater than about 0.55 dl/g, low shear melt viscosity greater than about 30,000 poise and a gas permeability which is at least 10% lower than that of unmodified polyester.

Frisk, et. al., WO 98/01346 disclose a container which is composed of a polymer material integrated with a plurality of nanosize particles of a clay mineral which act to enhance the barrier properties of the container. The polymer material may be PET, COPET or any mixture thereof. The nanocomposite polymer container decreases the permeability of various gases without substantially altering the fabrication method for producing containers composed of PET or COPET material, and without altering the containers themselves. The nanocomposite polymer containers of the disclosure are able to accomplish this due to the minimal amount of clay integrated with the polymer material, i.e., between 0.1% and 10% weight of the container. The small amount of clay provides a substantial barrier due to the high aspect ratios of the clay particles which will vary between 100 and 2000. The nanocomposite polymer container may be produced using in situ polymerization, solution intercalation, or melt exfoliation to integrate the clay mineral with the polymer material matrix. The clay mineral may be smectite, vermiculite, halloysite or any synthetic analog thereof, with a preference for the montmorillonite species of smectite clays.

SUMMARY OF THE INVENTION

This invention relates to squeezable containers for flowable products having improved barrier and/or mechanical properties, wherein the squeezable containers comprise a polymeric nanocomposite comprising a polymer and nanosize particles of a modified clay, and methods of making the squeezable containers. The invention further relates to squeezable containers for a flowable product comprising a head and a sleeve, at least one layer of said head or said sleeve comprising a polymeric nanocomposite, wherein said nanocomposite comprises a polymer and nanosize particles of a modified clay.

DETAILED DESCRIPTION OF THE INVENTION

Layered clay minerals such as smectite clays which are further exemplified by montmorillonite, nontronite, beidellite, volkonskoite, hectorite, saponite, sauconite, magadite, kenyaite and vermiculite are composed of packets of face to face stacking of individual silicate layers or sheets. In nature, the metal ions are substituted for ions such as Mg, Fe, Mn and Li. Because of this substitution, the sheets have a negative charge imbalance that is neutralized by hydratable cations such as sodium and calcium. The thickness of the sheets is about 1 nm and the diameter of the sheets is typically from 50 to 1000 nm resulting in aspect ratios of 50 to 1000. These layered clay minerals are also known as phyllosilicates.

It is known that these layered clay minerals can be treated with organic molecules such as, e.g., organic ammonium ions to insert the organic molecules between adjacent planar silicate layers thereby increasing the interlayer spacing between the adjacent silicate layers. This process is known as intercalation and the resulting treated clay mineral is termed "modified clay." The thus-treated intercalated phyllosilicates have interlayer spacing of at least 10–20 Å and up to about 100 Å. The modified clay may then be used in at least two distinct methods for preparing nanocomposites, i.e., melt compounding and in situ polymerization. Both methods are known to those skilled in the art. The preferred method of melt compounding of nanocomposites is with a twin-screw extruder or similar blending apparatus. In order to achieve good intercalation, exfoliation and dispersion of the clay minerals, processing conditions should be such that both shear rate and residence time are optimized.

In addition to these methods, the modified clay can also be incorporated into liquid coatings or adhesives. As with melt compounding, processing conditions should be such that both shear rate and residence time are optimized. The adhesive or coating may consist of monomer, oligomer, polymer or mixtures thereof and may undergo polymerization after it has been applied to a substrate.

The amount of modified clay combined with the polymer should be in an amount that is sufficient to provide the desired barrier and/or mechanical properties. The amount of modified clay in the nanocomposites of the invention comprises about 0.1% to about 25% by weight of the composition. A preferred range of modified clay material comprises about 0.5% to about 10% of the composition.

Polymers suitable for use in the nanocomposites of the present invention are exemplified, but not limited to, polyolefins such as low density polyethylene (LDPE), linear low density polyethylene (LLDPE), medium density polyethylene (MDPF), high density polyethylene (HDPE), and polypropylene (PP), polyamides such as poly(m-xyleneadipamide) (MXD6), poly(hexamethylenesebacamide), poly(hexamethyleneadipamide) and poly(-caprolactam), polyesters such as poly(ethylene terephthalate), and polyacrylonitriles. Other polymers suitable for use in the nanocomposites of the invention include ethylene vinyl alcohol copolymers, ethylene vinyl acetate copolymers, polyesters grafted with maleic anhydride, PVdC, aliphatic polyketone, and LCP (liquid crystalline polymers). A polyketone is exemplified by Carillon® which is produced by Shell. A liquid crystalline polymer is exemplified by Vectra® which is produced by Ticona. Further polymers that may be used include epoxy and polyurethane adhesives.

While certain clay minerals have been exemplified above it is understood that any clay mineral (both natural and synthesized) having a cation-exchange capacity of 50 to 200 milliequivalent/100 g and a large contact area with the polymer to be used in said nanocomposite are useful in the present invention.

Definition of Terms

Unless specifically set forth and defined or otherwise limited, the following terms as used herein have the following meanings.

Adhesive shall mean substances which bind/adhere; adhesives as used herein can generally be classified either as tie resins or laminating adhesives.

Aspect Ratio shall mean the ratio of a particular object's width to its thickness.

Barrier shall mean a material or a material structure such as a film, layer, membrane or surface coating which prevents the penetration or permeation of vapors or gases through or beyond the material or material structure acting as the barrier. Such barriers may be selective or non-selective depending on whether or not the barrier acts to prevent a specific (or number of specific) vapors or gases to penetrate or permeate the barrier material or structure. Thus, a water vapor or moisture barrier would prevent penetration or permeation by water vapor, an oxygen barrier would prevent penetration by oxygen (for example, oxygen as contained in the atmosphere) and a flavor or aroma barrier would prevent penetration by complex organic molecules that impart flavor or aroma. These barriers may act to prevent penetration or permeation by vapors or gases by means of certain physical or chemical properties that the barrier material or barrier structure possesses.

Coextruded Plastic Squeezable Containers or Tubes shall mean squeezable containers made by extruding polymer resins from multiple extruders into a combining section and then into an annular die. The resultant annular extrudate is cooled with water to form a continuous, multilayer cylinder. The cylinder, which is subsequently cut into segments, forms the sleeve of the squeezable container or tube. The resultant individual sleeves are mounted on tooling and a tube head is injection molded onto the end of the sleeve, forming the squeezable container or tube. A closure is then applied to the head.

Coinjected Squeezable Containers (Tube) Heads shall mean squeezable containers made by extruding polymer resins via multiple extruders into an injection molding machine into a combining section of the machine, commonly called a nozzle. From the nozzle, the multilayer plastic extrudate is injected into a metal mold. This metal mold is in contact with the squeezable container or tube sleeve which has been loaded on a metal mandrel. While in the metal mold, the polymers are cooled, concurrently adhering the head to the sleeve and forming the shape of the head of the squeezable container or tube. A closure is then applied to the head.

Core or core layer shall mean an interior layer of a multilayer film having an odd number of layers wherein the same number of layers is present on either side of the core layer.

Epoxy shall mean a compound containing an epoxide functionality.

Ethylene vinyl acetate copolymer (EVA) shall mean a copolymer formed from ethylene and vinyl acetate monomers wherein the ethylene derived units in the copolymer are present in major amounts and the vinyl acetate derived units in the copolymer are present in minor amounts.

Ethylene vinyl alcohol copolymer (EVOH) shall mean a copolymer formed by the hydrolysis of poly(vinyl acetate).

Exfoliate or exfoliated shall mean individual platelets of a modified clay so that adjacent platelets of the modified clay can be dispersed individually throughout a carrier material, such as water, a polymer, an alcohol or glycol, or any other organic solvent.

Exfoliation shall mean a process for forming an Exfoliate from a modified clay.

Intercalant shall mean an organic molecule such as an ammonium ion that is absorbed between platelets of the layered material and complexes with the $Na^+$ cations on the platelet surfaces to form an Intercalate.

Intercalate or intercalated shall mean a Layered Material that includes organic molecules disposed between adjacent platelets of the Layered Material to increase the interlayer spacing between the adjacent platelets to at least about 5 Å, preferably at least about 10 Å.

Intercalation shall mean a process for forming an Intercalate.

Interior or interior layer shall mean a layer of a multilayer film which is not a skin or surface layer of the film.

Intermediate or intermediate layer shall mean an interior layer of a multi-layer film which is positioned between a core layer and a surface layer of said film.

Label shall mean a multilayer polymer film that includes at least an inner adhesive layer that is capable of binding or adhering to a squeezable container and an outside layer.

Laminated Squeezable Container (Tube) Sleeves shall mean multilayer web structures produced via converting equipment, principally extrusion lamination or coextruded sheet processes. A web structure is produced as a flat sheet, which is wound into a roll configuration. In extrusion lamination, film rolls, typically produced via blown or cast film processes, are adhered together with monolayer extruded or coextruded polymers exiting a flat die arrangement. The resultant laminated web structure is wound into a roll form.

Laminating adhesive shall mean an adhesive between two substrates; typically laminating adhesives are thermosetting polymers such as polyurethane or epoxy that cure after they have been applied.

Layered Material shall mean an inorganic material, such as a smectite clay mineral, that is in the form of a plurality of adjacent, bound layers and has a thickness, for each layer, of about 3 Å to about 50 Å, preferably about 10 Å.

Matrix monomer shall mean a monomer that the Intercalate or Exfoliate is mixed with or dispersed.

Matrix polymer shall mean a thermoplastic or thermosetting polymer in which the Intercalate and/or Exfoliate is mixed or dispersed to form a Nanocomposite.

Modified clay shall mean layered clay material that has undergone intercalation.

Monolayer Plastic Squeezable Containers (Tubes) shall mean polymer resins extruded from a single extruder, into an annular die and cooled with water to form a continuous monolayer cylinder. The cylinder, which is subsequently cut into segments, forms the sleeve of the squeezable container or tube. The resultant individual sleeves are mounted on tooling and a squeezable container or tube head is injection molded onto the end of the sleeve, forming the squeezable container or tube. A closure is then applied to the head.

Monolayer Squeezable Container (Tube) Heads shall mean polymer resins extruded via a single extruder through an injection-molding machine into a metal mold. This metal mold is in contact with the squeezable container or tube sleeve, which has been loaded on a metal mandrel. While in the metal mold, the monolayer extrudate is cooled, adheres to the sleeve, and forms the shape of the head.

Nanocomposile shall mean a mixture that includes a monomer, polymer, oligomer, or copolymer having dispersed therein a plurality of individual platelets obtained from an exfoliated modified clay.

Optical properties shall mean properties including gloss, haze and clarity (all defined by Annual ASTM Book of Standards or TAPPI Test Methods)

Overwrap shall mean a multilayer polymer film that conforms closely to the outside of a squeezable container.

Platelets shall mean individual layers of the Layered Material.

Polyamides shall mean a polymer with repeating amide groups (HN—CO) such as poly(hexamethylene sebacamide), poly(hexamethylene adipamide), poly(-caprolactam) and poly(m-xyleneadipamide), and a copolymer of Nylon 6 with Nylon 6,6, which are also known as Nylon-6,10, Nylon 6,6, Nylon-6, MXD6, and Nylon 6/6,6, respectively.

Polyethylene shall mean families of resins obtained by substantially polymerizing the gas ethylene. By varying the comonomers, catalyst and methods of polymerization, properties such as density, melt index, crystallinity, degree of branching, molecular weight and molecular weight distribution can be regulated over wide ranges. Polyethylenes include low density polyethylenes (LDPE); medium density polyethylenes (MDPE); and high density polyethylenes (HDPE). Comonomers which are useful in the polyethylene resin family are alpha-olefins having from 4 to 20 carbons.

Polyethylene terephthalate (PET) shall mean a polyester formed by the condensation of ethylene glycol and terephthalic acid.

Polymer or polymer resin include but are not limited to, homopolymers, copolymers, such as for example, block, graft, random and alternating copolymers, terpolymers, etc., and blends and modifications thereof. Polymer or polymer resin shall also include all possible molecular configurations of the material. These structures include but are not limited to, isotactic, syndiotactic and random molecular configurations.

Polyolefins shall mean polymers of olefins such as, for example, ethylene, propylene, butenes, isoprenes and pentenes; including but not limited to homopolymers, copolymers, blends and modifications of said olefins.

Polyurethane shall mean polymers containing a urethane bond.

Smectite is a 2:1 type layer silicate with an expandable lattice carrying an excess negative layer charge. The 2:1 ratio refers to a layered structure consisting of an octahedral metal oxide sheet sandwiched between two tetrahedral silicon oxide sheets.

Squeezable Container (Tube) Head shall mean the portion of the squeezable container or tube from which a flowable product exits or dispenses from the squeezable container or tube. A closure is applied to the squeezable container or tube head. The tube head is generally a rigid structure.

Squeezable Container (Tube) Sleeve shall mean the portion of the squeezable container or tube that forms the boundary or wall of a squeezable container or tube enabling the squeezable container or tube to hold flowable products. The squeezable container or tube sleeve is generally a non-rigid, deformable structure.

Surface or surface layer or skin or skin layer shall mean a layer of a multi-layer film which comprises a surface thereof.

Tie resin or layer shall mean an adhesive comprised of thermoplastic polymer that has some affinity for materials it is meant to adhere to or bind together; typically tie resins are used in coextrusion or extrusion lamination and typically are polyolefin copolymers such as EVA, EAA or EMA, or polyolefins that are grafted with maleic anhydride (examples of grafted materials are Plexar® from Equistar and Bynel® from DuPont).

The mechanical properties of materials for plastic packaging are physical properties that relate to the response (deformation) of the material under an applied stress. Some important mechanical properties are tensile strength, stiffness (flexural modulus), compressive strength, and impact resistance (toughness). Concerning a squeezable container, mechanical properties relate to the deformation of the squeezable container under an applied stress or load. Such properties include top load, wall stiffness (resistance to buckling), and impact breakage resistance. Several standard ASTM tests for measuring mechanical properties of a material are listed below.

The term "thermal stability" relates to the changes in mechanical properties and dimensions of a squeezable container, with changes in temperature, especially at extremes of temperature. Some important measures of the thermal stability of a squeezable container are: shrinkage or relaxation at elevated temperatures; creep (gradual dimensional change) under load, especially at elevated temperatures; brittleness at cold temperatures; and loss of strength and stiffness at elevated temperatures. One standard method of gauging the degree of softening of a material at elevated temperatures is the heat deflection temperature (HDT), as defined in ASTM-648 below.

The squeezable containers of the present invention have improved barrier and/or mechanical properties and comprise at least one layer comprising a polymer material integrated with a modified clay wherein the modified clay is between about 0.5% to about 10% by weight of the nanocomposite layer.

The clay minerals may be selected from the group consisting of smectite, vermiculite and halloysite. A preferred group is smectite clay wherein smectite may be selected from montmorillonite, saponite, beidellite, nontronite, hectorite and mixtures thereof. Particularly preferred smectite clay for use in squeezable containers is montmorillonite. The clay is usually present in a sodium ion exchange form. The clay may also be treated with an intercalant which assists in the integration of the modified clay with the polymer material. Procedures for intercalating the clay minerals and forming the nanocomposites have been described earlier.

One source for the clay is Southern Clay Products, Inc., of Gonzales, Tex. which markets the clay under the product name "Cloisite" which are particular formulations of the clay and other minor components. Another source for the clay is Nanocor, Inc. of Carmel, Ind., which markets the clay under the product name "Nanomer". However, those skilled in the art will recognize that many sources of the clay are available and those sources may have their own particular formulations which are not outside the scope of the present invention.

Polymers suitable for use in the nanocomposites of the present invention are exemplified, but not limited to, polyolefins such as low density polyethylene (LDPE), linear low density polyethylene (LLDPE), medium density polyethylene (MDPE), high density polyethylene (HDPE), and polypropylene (PP), polyamides such as poly(m-xyleneadipamide) (MXD6), poly(hexamethylenesebacamide), poly(hexamethyleneadipamide) and poly(-caprolactam), polyesters such as poly(ethylene terephthalate), and polyacrylonitriles. Other polymers suitable for use in the nanocomposites of the invention include ethylene vinyl alcohol copolymers, ethylene vinyl acetate copolymers, polyesters grafted with maleic anhydride, PVdC, aliphatic polyketone, and LCP (liquid crystalline polymers). A polyketone is exemplified by Carillon® which is produced by Shell. A liquid crystalline polymer is exemplified by Vectra® which is produced by Ficona. Further polymers that may be used include epoxy and polyurethane adhesives.

While certain clays have been exemplified above it is understood that any clay (both natural and synthesized) having a cation-exchange capacity of 50 to 200 milliequivalent/100 g and a large contact area with the polymer to be used in said nanocomposite are useful in the present invention.

The squeezable containers of the invention have improved barrier and/or mechanical properties and comprise at least one layer of a polymer which has been integrated with nanosize particles of a modified clay. In another embodiment of the invention, the squeezable containers comprise a head and a sleeve, at least one of said head or said sleeve comprising a polymeric nanocomposite, wherein said nanocomposite comprises a polymer and nanosize particles of a modified clay.

In the squeezable container industry, there is a need to improve the barrier and mechanical properties of the squeezable containers. It has been known to blend inorganic filler materials with a polymer material in squeezable containers in order to achieve these improved properties. However this approach has not addressed the need completely as the inorganic filler may embrittle the structure and/or detract from its optical properties. It has now been found that the incorporation of nanocomposites into one or more of the polymeric layers of said squeezable containers can improve the barrier and/or mechanical properties without sacrificing and many times improving the mechanical and optical properties the other properties and polymeric nature of the material.

The squeezable containers of the present invention have improved barrier and/or mechanical properties and comprise at least one layer comprising polymer material integrated with a modified clay wherein the modified clay is between about 0.5% to about 10% weight of the nanocomposite layer.

The squeezable containers of the present invention include but are not limited to laminated squeezable containers and plastic squeezable containers and may consist of one or more polymeric layers wherein one or more of these layers may comprise a polymeric material integrated with a nanosize particle of a modified clay between about 0.5% to about 10% weight of the nanocomposite layer. The nanosize particles of the modified clay have a thickness of between about 3 Å and about 50 Å, and an aspect ratio of between about 50 and about 1000.

Laminated squeezable containers or tubes are tubes which are produced from flat, rollstoek. which is formed into tubes. Plastic squeezable containers or tubes are tubes which are produced by annular extrusion. The polymer is extruded into a cylindrical configuration and cut to form a sleeve for the tube. The head of the plastic tube is produced by injection or compression molding.

As mentioned above, the tubes of the present invention can be divided into at least two groups—laminated tubes and plastic tubes. Plastic tubes can be further divided into monolayer plastic tubes and coextruded plastic tubes. Both laminated tubes and plastic tubes consist of two parts—the sleeve and the head. Additionally, both the laminated tubes and the plastic tubes can have a coating applied to the outside of the entire tube.

The nanocomposites can be present in one or more layers which comprise the sleeve and/or head sections of both laminated tubes and plastic tubes. Additionally, the nanocomposite can also comprise the coating which can be applied as an overwrap to both plastic tubes and laminated tubes.

The tubes of the present invention have many applications in the packaging industry. These applications can be exemplified but not limited to laminated tubes for toothpaste, industrial caulks and pharmaceutical creams and ointments and plastic tubes for lotions and creams.

In order to evaluate the barrier properties of the containers of the present invention the following tests can be employed.

ASTM F1249 is a test for determining the rate of water vapor transmission through flexible barrier materials. The water vapor transmission rate is defined as the time rate of water vapor flow normal to the surfaces, under steady-state conditions, per unit area.

ASTM D3985 is a test method which covers a procedure for determination of the steady-state rate of transmission of oxygen gas through plastic films. The oxygen transmission rate is defined as the quantity of oxygen gas passing through a unit area of the parallel surfaces of a plastic film per unit time under the conditions of the D3985 test method.

ASTM D638 is a test method which covers the determination of the tensile properties of unreinforced and reinforced plastics in the form of dumb-bell shaped test specimens when tested under defined conditions of pretreatment, temperature, humidity, and testing machine speed. In general, this test measures the uniaxial strain (elongation) of the sample as a function of applied stress.

ASTM D790 is a test method which covers the determination of the flexural properties of unreinforced and reinforced plastics, from samples generally in the form of rectangular bars molded directly or cut from sheet or plate stock. In general, this test measures the stiffness, or the resistance of a material to bending.

ASTM D648 is a test method which covers the determination of the temperature at which an arbitrary deformation occurs when specimens are subjected to a particular set of testing conditions. This test provides a measure of the temperature stability of a material, i.e., the temperature below which the material does not readily deform under a standard load condition.

Preferred embodiments of squeezable containers or tubes of the present invention having improved barrier or mechanical properties are presented in the following examples, which are presented for illustrative purposes only and are not intended to limit the invention in any manner.

EXAMPLE 1

Monolayer Plastic Tubes

Sleeve compositions were made comprising a majority of single polymer which was selected from each of the following polymers: LLDPE, HDPE, polypropylene, or single site catalyzed polyethylene polymers. A minority component may be included as a blend with one of the above polymers. The minority components typically include color concentrates, UV absorbers and other additives known in the art.

Sleeve thickness: Ranging from 13 to 18 mils (330 to 457 microns).

Head composition: Comprised of a either a single major polymer or blends of polymers wherein the polymer was selected from LDPE, HDPE, and polypropylene. The thickness of the head is dependent on the individual injection mold tooling used.

Tube coating: An epoxy based coating can be applied as a liquid to the outside of the tube.

Nanocomposite addition: Nanocomposites are added to the sleeve polymers as a blend and also to the head polymers as a blend. Additionally, nanocomposites can be added to the tube coating. The nanocomposite comprises a polymer and a modified clay mineral wherein the mineral is montmorillonite obtained from Southern Clay Products, Inc., under the trade name of Cloisite or from Nanocor, under the trade name of Nanomer.

EXAMPLE 2

Coextruded Plastic Tubes which can Comprise Two to Six Layers.

Sleeve composition: A two-layer coextruded tube with the following compositions

| Two-Layer Coextruded Plastic Tube | | |
| --- | --- | --- |
| Layer | Material | Typical Percentage |
| Inner | LDPE | 85 to 75 |
| Outer | LDPE with Nanocomposite | 15 to 25 |

| Five-Layer Coextruded Plastic Tubes - Sleeve Composition | | | | |
| --- | --- | --- | --- | --- |
| | I | II | III | |
| | (Thick | (Thin | (Typical | |
| Layer | Inner Layer) | Inner Layer) | Structure) | Materials |
| Inner | 52% | 30% | 56% | LDPE |
| Tie | 5% | 5% | 2% | Polyethylene based tie layer |
| Barrier | 8% | 8% | 8% | Various barrier materials* |
| Tie | 5% | 5% | 2% | Polyethylene based tie layer |
| Outer | 30% | 52% | 30% | LDPE |

*The barrier layer can be selected from a group of polymers, which are selected from Nylon 6, MXD6, EVOH, PAN, PET, polyketone, thermoplastic epoxies, EMA and ionomer resin.

The thickness of the barrier layer in the above structure ranges from 5 to 8 microns. The thickness of the sleeve ranges from 250 to 500 microns.

Head compositions: The head can be a monolayer or multilayer structure. The monolayer head structure is comprised of a either a single major polymer or blends of polymers wherein the polymer is selected from LDPE. HDPE, and polypropylene. The thickness of the head is dependent on the individual injection mold tooling used. The second type of head composition is a multilayer, coinjected head structure which may be characterized by the following:

| Three-Layer Coinjected Head | | |
| --- | --- | --- |
| Layer | Percentage | Material |
| Inner | 10–20% | HDPE, LDPE, PP |
| Barrier | 4–8% | Various* |
| Outer | 80–90% | HDPE, LDPE, PP |

*The barrier layer can be selected from a group of polymers, which are Nylon 6, MXD6, EVOH, PAN, PET, PET, polyketone, thermoplastic epoxies, EMA and ionomer resin.

Nanocomposites are added at least one of the barrier layer in the sleeve and head composition for the two-layer structure, and barrier layer in the five-layer sleeves and coinjected head structures. Nanocomposites can optionally be added to the inner and outer layer of the coinjected head and coextruded sleeves structures. The nanocomposite comprises a polymer and a modified clay mineral wherein the mineral is montmorillonite obtained from Southern Clay Products, Inc., under the trade name of Cloisite or from Nanocor, under the trade name of Nanomer.

EXAMPLE 3

Laminate Type Structures—Foilless

| Sleeve Composition - Six-Layer Structure | | |
| --- | --- | --- |
| Layer | Layer Ratio, % | % Layer Composition |
| Outer (printer surface) | 15–20 | 100% LDPE |
| Bulk | 50–70 | 50–60% $CaCO_3$ Resin |
| | | 15–20% LLDPE |
| | | 10–20% HDPE |
| | | 5–10% $TiO_2$ |
| | | 2–5% LDPE |
| | | 0–20% Recycle |
| Tie | 2–5 | 100% LLDPE Tie |
| Barrier | 3–6 | 100% EVOH or other polymers* |
| Tie | 2–5 | 100% LLDPE Tie |
| Sealant | 15–20 | 70–80% LDPE |
| | | 20–30% LLDPE |
| | | 0–5% Antiblock |
| Total | 100 | |

*The barrier layer can be selected from a group of polymers, wherein the polymers can be selected from Nylon 6, MXD6, EVOH, PAN, PET, PET, polyketone, thermoplastic epoxies, EMA and ionomer resin.

| Laminated Foilless Structure | | |
| --- | --- | --- |
| Layer | Thickness | Material |
| Outside | 90–50 micron | Polyethylene Film |
| Outside Laminate | 50–75 micron | Extruded Polyethylene |
| Extruded Tie | 10–20 micron | Extruded Polyethylene Adhesive |
| Extruded Barrier | 10–25 micron | Extruded EVOH and Various* |
| Extruded Tie | 10–20 micron | Extruded Polyethylene Adhesive |
| Inside | 50–90 micron | Polyethylene Film |
| Total | 275–330 microns | |

*The barrier layer can be selected from a group of polymers, which are Nylon 6, MXD6, EVOH, PAN, PET, polyketone, thermoplastic epoxies, EMA and ionomer resin.

Sleeve thickness: The thickness range for these foilless structures is 10 to 15 mil or 250 to 380 microns.

Head composition: The head is a monolayer or multilayer structure. The monolayer head structure is comprised of a either a single major polymer or blends of polymers from the following: LDPE, HDPE and PP. The thickness of the head is dependent on the individual injection mold tooling used. The second type of head composition is a multilayer, coinjected head structure which may be characterized by the following:

| Coinjected Head Structure | | |
| --- | --- | --- |
| Layer | Percentage | Material |
| Inner | 10–20% | HDPE, LDPE, PP |
| Barrier | 4–8% | Various* |
| Outer | 80–90% | HDPE, LDPE, PP |

*The barrier layer can be selected from a group of polymers, which are Nylon 6, MXD6, EVOH, PAN, PET, PET, polyketone, thermoplastic epoxies, EMA and ionomer resin.

Nanocomposites can be optionally added to the barrier layers referenced above. Additionally, the incorporation of nanocomposites into the bulk and inner layers of foilless structures is optional. The addition of nanocomposites to the inner and outer layers of the head is also optional. The nanocomposite comprises a polymer and a modified clay wherein the modified clay is montmorillonite obtained from Southern Clay Products, Inc., under the product name of Cloisite or from Nanocor, Inc. under the product name of Nanomer.

Nanocomposites are targeted at reducing the permeation of flavor and oxygen through the tube wall and head. Thus, reduced permeation of flavor and oxygen are advantages versus the current foilless based tubes. Another advantage is the minor decrease in flavor absorption into the sleeve and head.

EXAMPLE 4

Nine Layer Structure

| Nine-Layer Structure | | |
| --- | --- | --- |
| Layer | Layer Ratio, % | Materials |
| Outer | 15–20 | LDPE |
| Tie | 2–5 | Polyethylene Based Tie |
| Barrier | 3–5 | EVOH or various* |
| Tie | 2–5 | Polyethylene Based Tie |
| Bulk | 40–60 | 60–80% HDPE or LDPE |
| | | 10–20% White Concentrate |
| | | 5–25% Regrind |
| Tie | 2–5 | Polyethylene Based Tie |
| Barrier | 3–5 | Barrier - EVOH or Various* |
| Tie | 2–5 | Polyethylene Based Tie |
| Inner | 15–20 | 60–80% HDPE or LDPE |
| | | 20–30% LLDPE |
| | | 0–5% Antiblock Concentrate |
| Total | 100 | |

*The barrier layer can be selected from a group of polymers, which are Nylon 6, MXD6, EVOH, PAN, PET, PET, polyketone, thermoplastic epoxies, EMA and ionomer resin.

EXAMPLE 5

Nanocomposites of the present invention may also be present in coatings which are applied to a squeezable container for flowable products. Examples of coating materials and methods of application are given below.

Coating—UV Cure

Coating—UV cure epoxy:—V113–114G UV Barrier Varnish from PPG Industries, Inc.

Substrate:—corona treated PET film.

Method:—Nanomer from Nanocor is incorporated into UV cure epoxy at 2.5% by weight. Mixed via high shear blender. Coating applied to PET by wire-wound rod and subsequently cured using a UV source.

Result:—15% improvement in oxygen barrier with no loss of transparency when applied to the PET film.

Coating-Vinyl Lacquer

Coating—vinyl lacquer:—mixture of acid-modified vinyl chloride-vinyl acetate copolymer resin with a vinyl solution and a plasticizer.

Substrate:—foil.

Method:—Cloisite from Southern Clay Products is incorporated into vinyl lacquer and a solution of methyl ethyl ketone (MEK) at 2% by weight loading relative to the dry lacquer. Mixed via high shear blender. Coating applied with wire-wound rod and subsequently dried.

What is claimed is:

1. A multilayer, foilless laminate squeezable container comprising a mono or multilayer sleeve and a mono or multilayer head wherein at least one of said sleeve or said head comprises a polymeric nanocomposite comprising a polymer and nanosize particles of a modified clay and wherein said sleeve comprises an outer layer comprising low density poly(ethylene); a bulk layer comprising low density poly(ethylene), linear low density poly(ethylene), and high density poly(ethylene); a first tie layer comprising linear low density poly(ethylene); a barrier layer comprising a polymeric nanocomposite comprising a polymer and nanosize particles of a modified clay.

2. A mutlilayer, foilless laminate squeezable container comprising squeezable container comprising a mono- or multilayer sleeve and a mono- or multilayer head wherein at least one of the sleeve or the head comprises a polymeric nanocomposite comprising a polymer and nanosize particles of a modified clay and wherein said sleeve comprises an outer layer comprising low density polyethylene;

a first tie layer comprising polyethylene;

a barrier layer comprising a polymeric nanocomposite comprising a polymer and nanosize particles of a modified clay wherein the polymer is selected from the group consisting of: polyolefins, polyamides, polyesters, polyacrylonitriles, ethylene vinyl alcohol copolymers, ethylene vinyl acetate copolymers, polyester grafted with maleic anhydride, polyvinylidene chloride, polyketone and liquid crystal polymers;

a second tie layer comprising polyethylene;

a bulk layer comprising high density polyethylene;

a third tie layer comprising polyethylene;

a second barrier layer that is the same as the first;

a fourth tie layer comprising polyethylene; and an inner layer comprising low density polyethylene and linear low density polyethylene.

* * * * *